United States Patent [19]
Kamijo

[11] Patent Number: 5,938,759
[45] Date of Patent: Aug. 17, 1999

[54] PROCESSOR INSTRUCTION CONTROL MECHANISM CAPABLE OF DECODING REGISTER INSTRUCTIONS AND IMMEDIATE INSTRUCTIONS WITH SIMPLE CONFIGURATION

[75] Inventor: Shunsuke Kamijo, Kawasaki, Japan

[73] Assignee: Fujitsu Limited, Kawasaki, Japan

[21] Appl. No.: 08/994,329

[22] Filed: Dec. 19, 1997

[30] Foreign Application Priority Data

Aug. 20, 1997 [JP] Japan .................................... 9-224081

[51] Int. Cl.⁶ ............................................. G06F 9/30
[52] U.S. Cl. ........................................ 712/209; 712/229
[58] Field of Search .................................. 712/209, 229

[56] References Cited

U.S. PATENT DOCUMENTS

| | | | |
|---|---|---|---|
| 3,781,823 | 12/1973 | Senese | 395/385 |
| 4,197,578 | 4/1980 | Wada et al. | 395/387 |
| 4,876,639 | 10/1989 | Mensch, Jr. | 395/500 |
| 5,117,488 | 5/1992 | Noguchi et al. | 395/386 |
| 5,179,691 | 1/1993 | O'Brien et al. | 395/500 |
| 5,335,331 | 8/1994 | Murao et al. | 395/389 |
| 5,421,029 | 5/1995 | Yoshida | 395/566 |
| 5,568,646 | 10/1996 | Jaggar | 395/385 |
| 5,652,852 | 7/1997 | Yokota | 395/384 |
| 5,740,461 | 4/1998 | Jaggar | 395/800.41 |
| 5,758,115 | 5/1998 | Nevill | 395/385 |
| 5,784,585 | 7/1998 | Denman | 395/385 |
| 5,790,824 | 8/1998 | Asghar et al. | 395/385 |
| 5,826,089 | 10/1998 | Ireton | 395/385 |
| 5,828,859 | 10/1998 | Tanihira et al. | 395/376 |
| 5,867,681 | 2/1999 | Worrell et al. | 395/384 |

*Primary Examiner*—William M. Treat
*Attorney, Agent, or Firm*—Staas & Halsey

[57] ABSTRACT

An instruction control mechanism, for processors, capable of decoding a register instruction and an immediate instruction with a simple configuration, is disclosed. The instruction control mechanism decodes and executes an instruction set including an instruction code having an instruction field, a first field containing the description of the name of the register to be processed and a second field containing the description of the name of another register or an immediate address. A register instruction code containing the description of another register to be processed in the second field has an instruction field of a specific value, and contains the description of a second instruction field in the portion other than the second field containing another register to be processed. An immediate instruction code containing the description of an immediate address in the second field has an instruction field containing the description of other than the specific value. At least part of the immediate instruction code and at least part of an immediate-like register instruction code for performing the same processing except that the immediate address and another register to be processed are used, are assigned the same value in the first instruction field and the second instruction field.

8 Claims, 12 Drawing Sheets

MOST-SIGNIFICANT BITS

| | 111 | 110 | 101 | 100 | 011 | 010 | 001 | 000 |
|---|---|---|---|---|---|---|---|---|
| 111 | CMPLEI Rs1, #16,Rd | MULI Rs1, #16,Rd | DIVI Rs1, #16,Rd | CUTI #16,Rd | LDBD @(Rs1,#16),Rd | | ADDI Rs1, #16,Rd | |
| 110 | CMPULEI Rs1, #16,Rd | MULUI Rs1, #16,Rd | DIVUI Rs1, #16,Rd | CUTSSI #16,Rd | LDHD @(Rs1,#16),Rd | | SUBI Rs1, #16,Rd | |
| 101 | CMPLTI Rs1, #16,Rd | CMPEQI Rs1, #16,Rd | MODI Rs1, #16,Rd | LDI #16,Rd | LDWD @(Rs1,#16),Rd | | LDIHI Rs1, #16,Rd | |
| 100 | CMPULTI Rs1, #16,Rd | CMPNEI Rs1, #16,Rd | MODUI Rs1, #16,Rd | | LDHHD @(Rs1,#16),Rd | | LDDD @(Rs1,#16),Rd | |
| 011 | CMPGEI Rs1, #16,Rd | BRT Rs1, #16 | SRLI Rs1, #16,Rd | SRLHI Rs1, #16,Rd | STBD Rd @(Rs1,#16) | | ANDI Rs1, #16,Rd | |
| 010 | CMPUGEI Rs1, #16,Rd | BRF Rs1, #16 | SRAI Rs1, #16,Rd | SRAHI Rs1, #16,Rd | STHD Rd @(Rs1,#16) | | ORI Rs1, #16,Rd | |
| 001 | CMPGTI Rs1, #16,Rd | BR #16 | SLLI Rs1, #16,Rd | SLLHI Rs1, #16,Rd | STWD Rd @(Rs1,#16) | | XORI Rs1, #16,Rd | |
| 000 | CMPUGTI Rs1, #16,Rd | CALL #16,Rd | ROLI Rs1, #16,Rd | RORI Rs1, #16,Rd | STHHD Rd @(Rs1,#16) | | | |

LEAST-SIGNIFICANT BITS

Fig.1A
PRIOR ART

| 31 | 25 | 20 | 15 | 10 | 4 | 0 |
|---|---|---|---|---|---|---|
| OP1 | Rs1 | Rd | Rs2 | | OP2 | |

Fig.1B
PRIOR ART

| 31 | 25 | 20 | 15 | 0 |
|---|---|---|---|---|
| OP1 | Rs1 | Rd | #16 | |

Fig. 3A
PRIOR ART

| 31 | | 25 | 20 | 15 | 10 | 4 | 0 |
|---|---|---|---|---|---|---|---|
| 0 | OP1 | Rs1 | Rd | Rs2 | | OP2 | |

Fig. 3B
PRIOR ART

| 31 | | 25 | 20 | 15 | | 0 |
|---|---|---|---|---|---|---|
| 0 | OP1 | Rs1 | Rd | | #16 | |

Fig. 3C
PRIOR ART

| 15 | | 9 | | | 0 |
|---|---|---|---|---|---|
| 1 | OP | | Rs1/Rd | | Rs2 |

Fig. 3D
PRIOR ART

| 15 | | 9 | | | 0 |
|---|---|---|---|---|---|
| 1 | OP | | Rs1/Rd | | #4 |

Fig.4A PRIOR ART

| 31 | 25 | 20 | 15 | 10 | 4 | 0 |
|---|---|---|---|---|---|---|
| OP1 | Rs1 | Rd | Rs2 | | OP2 | |

Fig.4B PRIOR ART

| 31 | 25 | 20 | 15 | 0 |
|---|---|---|---|---|
| OP1 | Rs1 | Rd | #16 | |

Fig.4C PRIOR ART

| 15 | 9 | 0 |
|---|---|---|
| OP | Rs1/Rd | Rs2 |

Fig.4D PRIOR ART

| 15 | 9 | 0 |
|---|---|---|
| OP | Rs1/Rd | #4 |

| | 111 | 110 | 101 | 100 | 011 | 010 | 001 | 000 |
|---|---|---|---|---|---|---|---|---|
| 111 | CMPLEI Rs1, #16,Rd | MULI Rs1, #16,Rd | DIVI Rs1, #16,Rd | CUTI #16,Rd | LDBD @(Rs1,#16),Rd | | ADDI Rs1, #16,Rd | |
| 110 | CMPULEI Rs1, #16,Rd | MULUI Rs1, #16,Rd | DIVUI Rs1, #16,Rd | CUTSSI #16,Rd | LDHD @(Rs1,#16),Rd | | SUBI Rs1, #16,Rd | |
| 101 | CMPLTI Rs1, #16,Rd | CMPEQI Rs1, #16,Rd | MODI Rs1, #16,Rd | LDI #16,Rd | LDWD @(Rs1,#16),Rd | | LDIHI Rs1, #16,Rd | |
| 100 | CMPULTI Rs1, #16,Rd | CMPNEI Rs1, #16,Rd | MODUI Rs1, #16,Rd | | LDHHD @(Rs1,#16),Rd | | LDDD @(Rs1,#16),Rd | ▨ |
| 011 | CMPGEI Rs1, #16,Rd | BRT Rs1,#16 | SRLI Rs1, #16,Rd | SRLHI Rs1, #16,Rd | STBD Rd @(Rs1,#16) | | ANDI Rs1, #16,Rd | |
| 010 | CMPUGEI Rs1, #16,Rd | BRF Rs1,#16 | SRAI Rs1, #16,Rd | SRAHI Rs1, #16,Rd | STHD Rd @(Rs1,#16) | | ORI Rs1, #16,Rd | |
| 001 | CMPGTI Rs1, #16,Rd | BR #16 | SLLI Rs1, #16,Rd | SLLHI Rs1, #16,Rd | STWD Rd @(Rs1,#16) | | XORI Rs1, #16,Rd | |
| 000 | CMPUGTI Rs1, #16,Rd | CALL #16,Rd | ROLI Rs1, #16,Rd | RORI Rs1, #16,Rd | STHHD Rd @(Rs1,#16) | | | ▨ |

MOST-SIGNIFICANT BITS (columns) / LEAST-SIGNIFICANT BITS (rows)

Fig.8A

| OPERATION | | OP1 | OP2 | OP3 |
|---|---|---|---|---|
| CMPLE | Rs1,Rs2,Rd | 000100 | 111111 | 00000 |
| CMPULE | Rs1,Rs2,Rd | 000100 | 111110 | 00000 |
| CMPLT | Rs1,Rs2,Rd | 000100 | 111101 | 00000 |
| CMPULT | Rs1,Rs2,Rd | 000100 | 111100 | 00000 |
| CMPGE | Rs1,Rs2,Rd | 000100 | 111011 | 00000 |
| CMPUGE | Rs1,Rs2,Rd | 000100 | 111010 | 00000 |
| CMPGT | Rs1,Rs2,Rd | 000100 | 111001 | 00000 |
| CMPUGT | Rs1,Rs2,Rd | 000100 | 111000 | 00000 |
| CMPEQ | Rs1,Rs2,Rd | 000100 | 110101 | 00000 |
| CMPNE | Rs1,Rs2,Rd | 000100 | 110100 | 00000 |
| MUL | Rs1,Rs2,Rd | 000100 | 110111 | 00000 |
| MULU | Rs1,Rs2,Rd | 000100 | 110110 | 00000 |
| DIV | Rs1,Rs2,Rd | 000100 | 101111 | 00000 |
| DIVU | Rs1,Rs2,Rd | 000100 | 101110 | 00000 |
| MOD | Rs1,Rs2,Rd | 000100 | 101101 | 00000 |
| MODU | Rs1,Rs2,Rd | 000100 | 101100 | 00000 |
| SRL | Rs1,Rs2,Rd | 000100 | 101011 | 00000 |
| SRA | Rs1,Rs2,Rd | 000100 | 101010 | 00000 |
| SLL | Rs1,Rs2,Rd | 000100 | 101001 | 00000 |
| ROL | Rs1,Rs2,Rd | 000100 | 101000 | 00000 |
| SRLH | Rs1,Rs2,Rd | 000100 | 100011 | 00000 |
| SRAH | Rs1,Rs2,Rd | 000100 | 100010 | 00000 |
| SLLH | Rs1,Rs2,Rd | 000100 | 100001 | 00000 |
| ROR | Rs1,Rs2,Rd | 000100 | 100000 | 00000 |
| CUT | Rs2,Rd | 000100 | 100111 | 00000 |
| CUTSS | Rs2,Rd | 000100 | 100110 | 00000 |
| LDB | @(Rs1,Rs2),Rd | 000100 | 011111 | 00000 |
| LDH | @(Rs1,Rs2),Rd | 000100 | 011110 | 00000 |
| LDHS | @(Rs1,Rs2),Rd | 000100 | 011110 | 10000 |
| LDW | @(Rs1,Rs2),Rd | 000100 | 011101 | 00000 |
| LDWS | @(Rs1,Rs2),Rd | 000100 | 011101 | 10000 |
| LDHH | @(Rs1,Rs2),Rd | 000100 | 011100 | 00000 |
| STB | Rd,@(Rs1,Rs2) | 000100 | 011011 | 00000 |
| STH | Rd,@(Rs1,Rs2) | 000100 | 011010 | 00000 |
| STHS | Rd,@(Rs1,Rs2) | 000100 | 011010 | 10000 |
| STW | Rd,@(Rs1,Rs2) | 000100 | 011001 | 00000 |
| STWS | Rd,@(Rs1,Rs2) | 000100 | 011001 | 10000 |
| STHH | Rd,@(Rs1,Rs2) | 000100 | 011000 | 00000 |
| LDD | @(Rs1,Rs2),Rd | 000100 | 001100 | 00000 |
| LDDS | @(Rs1,Rs2),Rd | 000100 | 001100 | 10000 |
| ADD | Rs1,Rs2,Rd | 000100 | 001111 | 00000 |
| SUB | Rs1,Rs2,Rd | 000100 | 001110 | 00000 |
| AND | Rs1,Rs2,Rd | 000100 | 001011 | 00000 |
| OR | Rs1,Rs2,Rd | 000100 | 001010 | 00000 |
| XOR | Rs1,Rs2,Rd | 000100 | 001001 | 00000 |

Fig.8B

| | | | | |
|---|---|---|---|---|
| CALLR | @Rs1, Rd | 000000 | 110000 | 00001 |
| JMP | @Rs1, | 000000 | 110000 | 10001 |
| MAC | Rs1,Rs2 | 000000 | 110111 | 00000 |
| MACH | Rs1,Rs2 | 000000 | 110111 | 10000 |
| MULH | Rs1,Rs2 | 000000 | 110111 | 11000 |
| FMACSS | Rs1,Rs2,Rd | 000000 | 110111 | 10100 |
| FMULSS | Rs1,Rs2,Rd | 000000 | 110111 | 11000 |
| HALT | | 000000 | 011001 | 00011 |
| HALTB | | 000000 | 011001 | 10011 |
| ADDSS | Rs1,Rs2,Rd | 000000 | 001111 | 00100 |
| ADDHSS | Rs1,Rs2,Rd | 000000 | 001111 | 10100 |
| ADDHUS | Rs1,Rs2,Rd | 000000 | 001111 | 11100 |
| AVEH | Rs1,Rs2,Rd | 000000 | 001111 | 10000 |
| SUBSS | Rs1,Rs2,Rd | 000000 | 001110 | 00100 |
| SUBHSS | Rs1,Rs2,Rd | 000000 | 001110 | 10100 |
| SUBHUS | Rs1,Rs2,Rd | 000000 | 001110 | 11100 |
| NEG | Rs2,Rd | 000000 | 001110 | 00010 |
| NOT | Rs1, Rd | 000000 | 001001 | 00001 |
| NOP | | 000000 | 000000 | 00011 |
| CLRACC | | 000000 | 000000 | 10011 |
| EXTZB | Rs1, Rd | 000000 | 001011 | 00001 |
| EXTZH | Rs1, Rd | 000000 | 001011 | 10001 |
| SATS | Rs1,Rs2,Rd | 000000 | 001101 | 00100 |
| SATU | Rs1,Rs2,Rd | 000000 | 001101 | 01100 |
| SATHS | Rs1,Rs2,Rd | 000000 | 001101 | 10100 |
| SATHU | Rs1,Rs2,Rd | 000000 | 001101 | 11100 |
| MOV | Rs1, Rd | 000000 | 001101 | 00001 |

Fig.9

| OPERATION | | FORMAT | CODE | | |
|---|---|---|---|---|---|
| ADD | R1,#4 | SI | (001111 | 0**** | 0****) |
| ADD | R1,R2 | SR | (001111 | 0**** | 0****) |
| ADDSS | R1,R2 | SR | (001111 | 0**** | 1****) |
| ADDHSS | R1,R2 | SR | (001111 | 1**** | 0****) |
| ADDHUS | R1,R2 | SR | (001111 | 1**** | 1****) |

PROCESSOR INSTRUCTION CONTROL MECHANISM CAPABLE OF DECODING REGISTER INSTRUCTIONS AND IMMEDIATE INSTRUCTIONS WITH SIMPLE CONFIGURATION

BACKGROUND OF THE INVENTION

1. Field of the Invention

The present invention relates to an instruction control mechanism for processors capable of executing an instruction set efficiently with a simple configuration and, in particular, to a technique for realizing an instruction control mechanism for processors capable of executing an instruction set which can use abbreviated instructions for a smaller program size, and a multiplicity of instructions efficiently, with a simple configuration.

2. Description of the Related Art

The instruction set that can be executed is predetermined for a given processor. The instruction code constituting the instruction set includes an instruction field (operation code) and at least one operand. The instruction field is a portion representing the instruction to be processed, and the operand is a portion representing a register or a memory address. The operand may be a numerical value used for the processing. Such a numerical value is called an immediate value or a literal.

There are various types of instructions including an instruction with a single operand such as a jump instruction, an instruction having two operands to be added or otherwise calculated with the result thereof stored in one of the operands, an instruction having two operands from one of which a value is moved to the other, and an instruction having three operands with two of them added or otherwise calculated with the result thereof stored in the remaining operand. An instruction having three operands can be realized by combining instructions having two operands, and therefore some instruction sets have no instruction having three operands. The description that follows concerns an instruction set having three addressing modes using one, two or three operands, respectively. The instruction in addressing mode using only a register is called a register instruction, and the instruction in addressing mode using an immediate address is called an immediate instruction. The present invention handles an instruction set in which the register instruction has the same length as the immediate instruction.

With the trend toward higher speed and lower cost in recent years, various processes which have thus far been executed using dedicated circuits have come be executed with a single processor by switching the program. This has given rise to various problems, however, including an extremely increased program size, an increased number of memories, such as caches, built in a chip or external memories and an increased power consumption due to the fact that such memories are accessed more frequently. The widespread use of portable communication and other electronic equipments has caused the processor cost and the power consumption to represent a considerable proportion of the overall cost of the equipment. The problem is then how to reduce the whole program size of the processor. It is therefore desirable for an instruction set, if predetermined in length, to contain as many instruction codes as possible in it.

Another solution to this problem is to use abbreviated instructions. The use of abbreviated instructions can reduce the program size. A conventional processor is available with which abbreviated instructions can be used as well as basic-length instructions. In a conventional example method permitting the use of both basic-length instructions and abbreviated instructions, a bit indicating the instruction length is inserted in the instruction field beforehand to identify the instruction in a program as a basic-length instruction or as an abbreviated instruction. In this method, however, the use of one bit for this identification undesirably reduces the number of bits available for the other fields.

In view of this, according to another conventional method, the mode is switched in response to a mode switching instruction in a program by a mode switching means included in the processor. In abbreviated instruction mode, all the instruction codes are processed as abbreviated ones. In this method, however, the instructions not assigned for the abbreviated instruction set cannot of course be used. Since all the basic-length instructions cannot be basically assigned for abbreviation, it follows that some instructions included in the basic-length instruction set cannot be used as an abbreviated instruction. Such instructions cannot be used in abbreviated instruction mode, and if such instructions are to be used, it is necessary to convert them into basic-length instructions. This complicates the program and increases the size of the program.

The above-mentioned two methods use the same length of the instruction field for both the basic-length instructions and the abbreviated instructions. Nevertheless, many instructions can be held as abbreviated instructions by differentiating the structure of the instruction field between the basic-length instruction set and the abbreviated instruction set. If an instruction decoder is to be shared for that purpose in a processor capable of executing the two types of instruction sets by switching, however, a conversion circuit is required for converting an abbreviated instruction field into a basic-length instruction field. In the normal processing operation, the conversion circuit consumes a stage of pipelines or at least imposes a burden on the critical path of the decoder, resulting in the problem of an increased hardware size and a deteriorated performance due to an increased branch penalty.

SUMMARY OF THE INVENTION

An object of the present invention is to realize an instruction control mechanism, for processors, with a simple configuration capable of executing an instruction code set which can reduce the size of program, in which an instruction set of the same code length can represent as many types of instruction codes as possible. Another object of the invention is to realize an instruction control mechanism for processors with a simple configuration capable of executing a multiplicity of abbreviated instructions efficiently with a predetermined length of code.

In order to achieve the above-mentioned objects, according to the present invention, there is provided a processor instruction control mechanism, which takes note of the fact that in the case where the name of a register is described in the second field of the instruction code adapted to contain the description of a register name or an immediate value, the second field has a second instruction field not in use. As for a register instruction for storing the register name to be processed in the second field, a specific value is assigned to the first instruction field, and an actual instruction is described in the second instruction field. As for an immediate instruction, on the other hand, a value other than the particular specific value is assigned to the first instruction field, and in addition, the same value is assigned to the first instruction field and the second instruction field of at least a part of the immediate instruction code and at least a part of the immediate-like register instruction code processed the same way except that an immediate address and a register are used. In this way, a complicated instruction decoder is not required.

Specifically, according to the present invention, there is provided an instruction control mechanism, for processors, decoding and executing an instruction set including an instruction code configured of an instruction field, a first field containing the description of the name of a register to be processed, and a second field containing the description of the name of another register to be processed or an immediate address, comprising:

an instruction decoder for decoding the value of the instruction field, a register indicated by the name of the register to be processed or another register to be processed, a memory circuit for storing the immediate value, an arithmetic circuit for processing the value stored in the register or in the register and the memory circuit in accordance with the result of decoding by the instruction decoder;

wherein a register instruction code having the second field containing the description of another register to be processed includes an instruction field of a specific value and a second instruction field in the portion of the second field not containing the description of another register to be processed, wherein an immediate instruction code having the second field containing the description of an immediate address includes an instruction field containing the description of a value other than the specific value, and wherein at least a part of the immediate instruction code and at least a part of the immediate-like register instruction code for performing the same processing, except that the immediate address is used in place of the value of another register, have the same value assigned to the first instruction field and the second instruction field thereof;

the instruction control mechanism further comprising a register instruction detection circuit for judging whether the first instruction field is a specific value and a select circuit for switching the operation in such a manner that the second instruction field is input to the instruction decoder when the first instruction field is a specific value and the first instruction field is input to the instruction decoder when the first instruction field is not a specific value, in accordance with the result of judgement by the register instruction detection circuit.

Also, at least a part of the second register instruction code for performing the processing similar to the immediate instruction code and the immediate-like register instruction code but using no immediate value or the value of another register to be processed, includes a first instruction field assigned a second specific value other than the first specific value and a second instruction field assigned the same value as the second instruction field of the immediate-like register instruction code. The register instruction detection circuit preferably judges also whether the first instruction field is a second specific value or not. An example of this instruction is an inter-register transfer instruction.

In an instruction control mechanism for processors according to this invention, the operation is switched between a basic-length instruction execution mode and an abbreviated instruction execution mode, and is thus capable of executing the two types of instructions. The instruction field of the abbreviated instruction code is located at the same position as that of the basic-length instruction code and has the contents to be processed of the same value as the second instruction field of the immediate-like register having similar contents to be processed, the instruction control mechanism further comprising a mode switching circuit for switching between a basic-length mode for processing the basic-length instruction code and an abbreviation mode for processing the abbreviated instruction code, and means for changing the decoding process of the instruction decoder in accordance with the prevailing mode.

Assuming that when the register instruction detection circuit detects that the instruction field is a specific value in abbreviation mode, the instruction decoder processes the instruction code as a basic-length instruction code. Then, the basic-length instruction can be executed even in abbreviated instruction execution mode.

BRIEF DESCRIPTION OF THE DRAWINGS

The present invention will be more clearly understood from the description as set below with reference to the accompanying drawings, wherein:

FIG. 1A is a diagram showing an example of a conventional configuration of an instruction code in register addressing mode;

FIG. 1B is a diagram showing an example of a conventional configuration of an instruction code in immediate addressing mode;

FIGS. 3A to 3D are diagrams showing an example of a conventional configuration of an instruction code having an abbreviated instruction;

FIGS. 4A to 4D are diagrams showing another example of a conventional configuration of an instruction code having an abbreviated instruction;

FIGS. 6A to 6D are diagrams showing a structure of an instruction code according to an embodiment of the present invention;

FIG. 7 is a diagram showing a set of basic-length immediate addressing instructions in the instruction field OP1 according to an embodiment;

FIGS. 8A and 8B are diagrams showing a set of basic-length register addressing instructions in the instruction field of a according to an embodiment;

FIG. 9 is a diagram showing an example of abbreviated instructions according to an embodiment;

DESCRIPTION OF THE PREFERRED EMBODIMENTS

Before proceeding to a detailed description of the preferred embodiments of the present invention, prior art instruction control mechanisms of processors will be described to allow a clearer understanding of the difference between the present invention and the prior art.

FIG. 1A is a diagram showing an example of a conventional configuration of an instruction code of a register instruction, and FIG. 1B is a diagram showing an example of a conventional configuration of an instruction code of an immediate instruction. As shown, the register instruction and the immediate instruction have the same length. The present invention is intended for an instruction set in which the register instruction and the immediate instruction have the length as shown in these diagrams. The memory addressing instruction for indicating a memory address directly may have a length identical to or different from the register instruction and the immediate instruction. In any case, however, the present invention is applicable.

As shown in FIG. 1A, the register instruction has the most significant six bits represent an instruction field OP1, the next five bits represent a first register Rs1 for the arithmetic operation, and the next five bits represent a result storage register Rd for storing the result of the arithmetic operation. As shown in FIG. 1B, the portions up to this point are identical to those of the immediate instruction. In the register instruction, however, the five-bit portion following these portions represents a second register Rs2 for arithmetic operation, whereas the immediate instruction has the following 16 bits representing an immediate address. The remaining 11 bits after the second register Rs2 of the register instruction represents a second instruction field OP2 which, when combined with the OP1, forms an instruction field. The register instruction thus has more field types than the immediate instruction.

Figure 2:
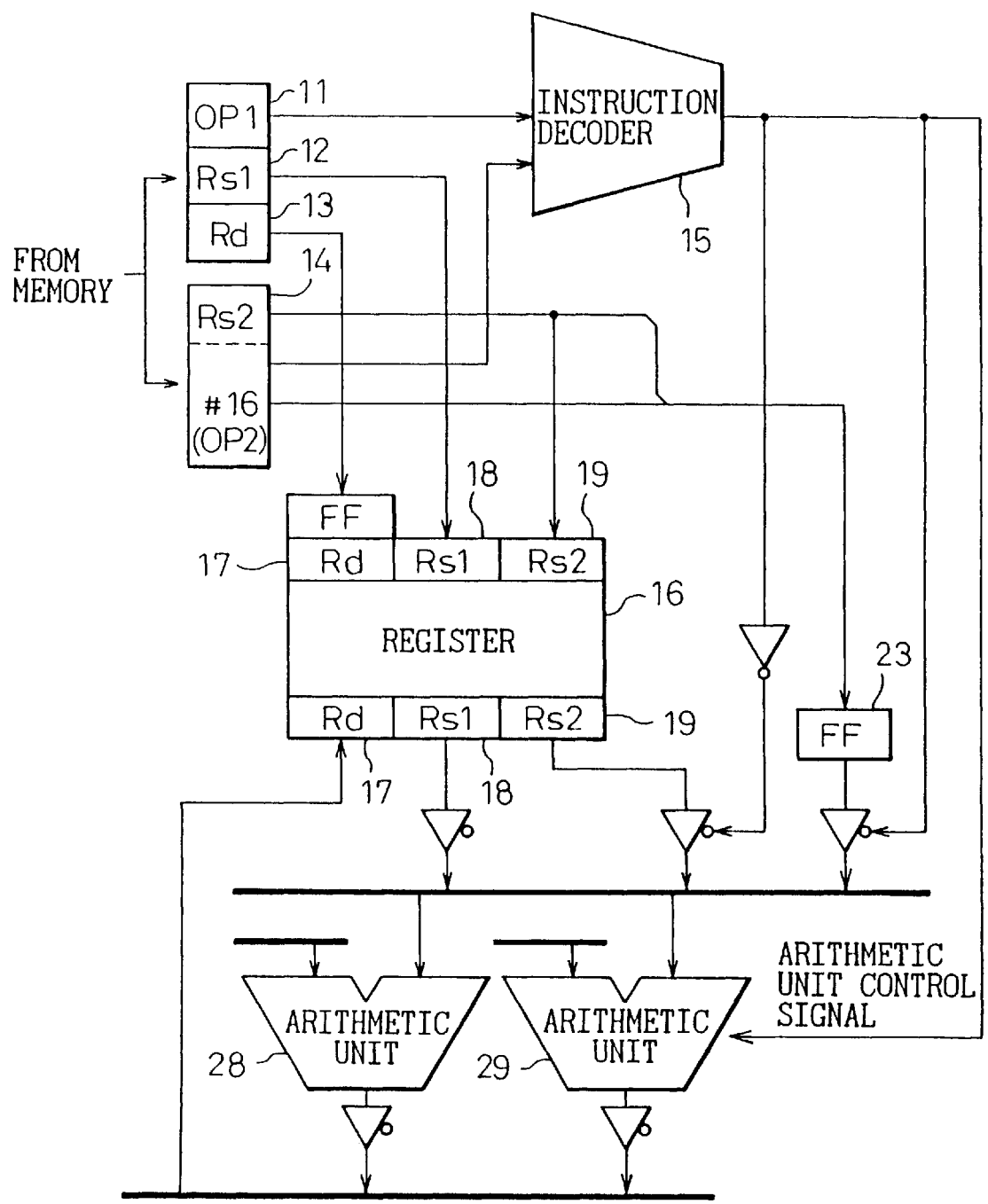
FIG. 2 is a diagram showing an example of a conventional configuration of an instruction control mechanism for processors.

FIG. 2 is a diagram showing an example of a conventional configuration of an instruction control mechanism of processors for executing the instruction set as shown in FIGS. 1A, 1B. The program is stored in a memory. An instruction code read from the memory is temporarily held in the instruction-holding flip-flops 11 to 14. Reference numeral 11 designates a portion for holding the value indicated by the instruction field OPI, numeral 12 a portion for holding the value indicating the first register Rs1 for arithmetic operation, numeral 13 a portion for holding the value indicating the first result storage register Rd, numeral 14 designates a portion for holding the value indicating the second register Rs2 for arithmetic operation and the value indicating the second instruction field OP2 for the register instruction or a portion for holding the immediate address for the immediate instruction. The instruction fields OP1, OP2 held in the flip-flops 11, 14 are output to an instruction decoder 15, in which they are decoded and the contents to be processed are indicated to arithmetic units 28, 29, while at the same time determining whether the value of the second register Rs2 for arithmetic operation or the immediate address is used in accordance with the instruction. Registers 18, 19, 17 are specified by the values held in the flip-flops 12, 13 and 14 (only the portion Rs2). The value held in the flip-flop 14 is also held in the flip-flop 23. In accordance with the result of decoding by the instruction decoder 15, the value of the register 19 or the value held in the flip-flop 23 are output to an internal bus, and together with the register 18 output at the same time, are applied to the arithmetic units 28, 29, in which the arithmetic operation is performed as indicated by the instruction field(s) OP. The result of the arithmetic operation is stored in the register 17. In this way, an instruction code is completely processed. The instruction codes specified by the program are processed in similar fashion sequentially.

FIGS. 3A to 3D are diagrams showing a configuration of a conventional instruction code in which both the basic-length instruction and the abbreviated instruction can be used. In this method, the instruction field contains a bit indicating the instruction length to identify whether the instruction in the program is a basic-length instruction or an abbreviated instruction. In the shown example, the most significant bit is assigned as an identification bit. In this case, however, the use of one bit for this purpose reduces the number of bits of the other fields by one bit. For example, in the present case where one bit of the instruction field is assigned for identification between the basic-length instruction and the abbreviated instruction, the length of the instruction field is reduced from 6 bits to 5 bits. Six bits can represent 64 instructions, while five bits can express only 32 instructions. Another portion such as the immediate address portion may alternatively be assigned for identification between the basic-length instruction and the abbreviated instruction, in which case, however, the range of the immediate address is reduced by one half. This poses a serious problem to the abbreviated instruction for which the length of the instruction code is limited.

In view of this, a processor includes a mode switching mechanism for switching the mode in response to a mode switch instruction in the program. In an abbreviated instruction mode, for example, all the instruction codes are processed as abbreviated instructions. FIGS. 4A to 4D are diagrams showing a conventional configuration of an instruction code for which the mode can be switched. In this method, however, instructions not assigned as the abbreviated instructions cannot of course be used. Nevertheless, it is basically impossible to assign the whole basic-length instruction set as an abbreviated instruction set, with the result that some instructions in the basic-length instruction set cannot be used as an abbreviated instruction. Such instructions cannot be used in abbreviated instruction mode. For using such instructions, it is necessary to switch to a basic-length instruction mode. This both complicates the program and increases the program size.

Figure 5:
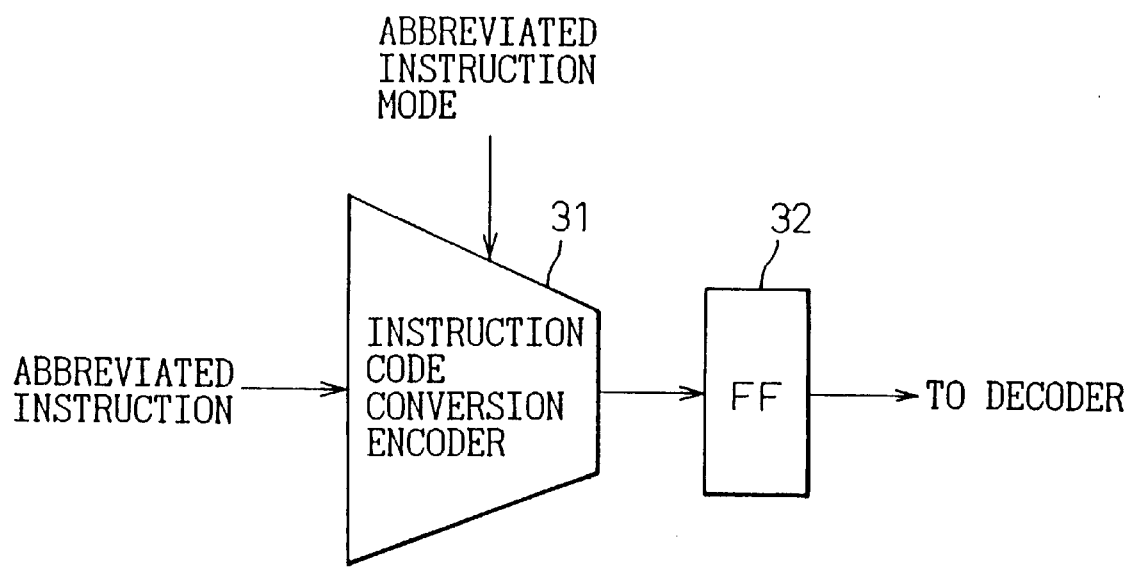
FIG. 5 is a diagram showing a conventional conversion mechanism for converting an abbreviated instruction to a basic-length instruction.

In the above-mentioned two methods, the basic-length instruction and the abbreviated instruction are assumed to have the same length of an instruction field. If the structure of the instruction field is considerably differentiated between the basic-length instruction set and the abbreviated instruction set, however, many instructions can be used as abbreviated instructions. In such a case, however, a processor that can execute both types of instruction sets by mode switching is required to include a circuit as shown in FIG. 5 for converting an abbreviated instruction field to a basic-length instruction field. This circuit includes an instruction code conversion encoder 31 for converting, in abbreviated instruction mode, the instruction field for the abbreviated instruction into the instruction field for the basic-length instruction code to execute the corresponding contents, and a flip-flop 32 for storing the output of the instruction code conversion encoder 31 temporarily. In normal processing, however, a stage of pipelines is used or at least the critical path of the decoder is stressed for the processing in this conversion circuit, not only requiring increased hardware but also increasing the branch penalty to give a reduced performance.

FIGS. 6A to 6D are diagrams showing a structure of the instruction code according to an embodiment of the present invention. FIG. 6A shows a register addressing instruction of basic length, FIG. 6B shows an immediate addressing instruction of basic length, FIG. 6C shows a register addressing instruction of abbreviated length, and FIG. 6D an immediate addressing instruction of abbreviated length. As shown in these diagrams, the instruction code according to this embodiment has the abbreviated instruction and the basic-length immediate addressing instruction of the same structure as the conventional instruction code shown in FIGS. 4B to 4D, except for the structure of the basic-length register addressing instruction. In the basic-length addressing instruction, the value of the first instruction field OP1 representing the most-significant six bits is 000000 or 000100, and the second instruction field OP2 and the third instruction field OP3 are assigned to the least-significant 11 bits which have not been conventionally used.

FIG. 7 is a diagram showing a set of basic-length immediate addressing instructions according to an embodiment. Though each instruction will not be described in detail, there are 46 instructions and no corresponding instructions are defined in the blanks, and the hatched portions, i.e., 000000 and 000100 indicate the basic-length register addressing instructions.

FIGS. 8A and 8B are diagrams showing a set of basic-length register addressing instructions. As shown, the value of the first instruction field of the basic-length register addressing instruction is 000000 or 000100, and the contents to be processed are defined by the value of the second instruction field OP2. It should be noted here that the value of the second instruction field OP2 is the same as the value of the first instruction field OP1 of the basic-length immediate addressing instruction for performing a similar processing. For example, the value of the second instruction field OP2 of a multiply instruction MUL (Rs1, Rs2, Rd) of the basic-length register addressing instruction with the first instruction field OPI having a value of 000000 is 110111, which is the same value as the first instruction field OP1 of the corresponding basic-length immediate addressing instruction MULI (Rs1, #16, Rd). Also, the value of the second instruction field OP2 of the add instruction ADD (Rs1, Rs2, Rd) of the basic-length register addressing instruction code with the first instruction field OPI having a value of 000000 is 001111, which is the same value as the first instruction field OP1 of the corresponding basic-length immediate addressing instruction ADDI (Rs1, #16, Rd).

In similar fashion, the value of the second instruction field OP2 of the basic-length register addressing instruction with the first instruction field OPI having a value of 000100 is the same as the value of the first instruction field OP1 of the basic-length immediate addressing instruction for performing a similar processing. The add instruction, for example, represents various add operations including a 32-bit add operation with unsigned saturated processing (ADD), a 32-bit add operation with signed saturated processing (ADDSS), an add operation (ADDHSS) with the operand divided into the most significant 16 bits and the least significant 16 bits for each of which the 16-bit add operation with signed saturated processing is performed at the same time, and an add operation (ADDHUS) with the operand divided into the most significant 16 bits and the least significant 16 bits for each of which the 16-bit add operation with unsigned saturated processing is performed at the same time. According to this embodiment, ADDSS is defined as a basic-length register addressing instruction with the first instruction field OP1 having a value of 000000, and ADDSS, ADDHSS and ADDHUS are defined as a basic-length register addressing instruction with the first instruction field OP1 having a value of 000001. The value of the second instruction field OP2 of ADDSS, ADDHSS and ADDHUS is 001111. These processes are identified by differentiating the value of the third instruction field OP3. In this way, the processes similar to each other but having different detailed contents are defined by the third instruction field OP3.

As shown in FIG. 7, the first instruction field OP1 is 6 bits, in which a maximum of 64 instructions can be defined. In the prior art, the immediate addressing instructions are defined with these 64 instructions. The register addressing instructions, on the other hand, have conventionally been defined by combining OP1 and OP2. According to this embodiment, in contrast, 46 immediate addressing instructions and 72 register addressing instructions are defined. In addition, up to 62 immediate addressing instructions can be defined (by assigning two values to a register addressing instruction), and up to 62 register addressing instructions (except for 000000 and 000100) can be defined even for the second instruction field OP2 alone. If the third instruction field OP3 is used, however, it is possible to define 32 times as many register addressing instructions.

FIG. 9 is a diagram showing examples of abbreviated instructions for an add operation. It should be noted that the value 001111 of the instruction field of the abbreviated instruction is the same as that of the first instruction field OP1 of the basic-length immediate addressing instruction and that of the second instruction field OP2 of the basic-length register addressing instruction for performing a similar processing. Also, which add instruction is involved, ADD, ADDSS, ADDHSS or ADDHUS described above, is defined by a combination of the values of the 9th bit and the 5th bit. For the abbreviated instruction, the first register Rs1 for arithmetic operation is identical to the result storage register Rd for storing the result of the arithmetic operation. Thus the value in the register indicated by Rs1/Rd is processed and the result of the processing is stored in the same register.

Figure 10:
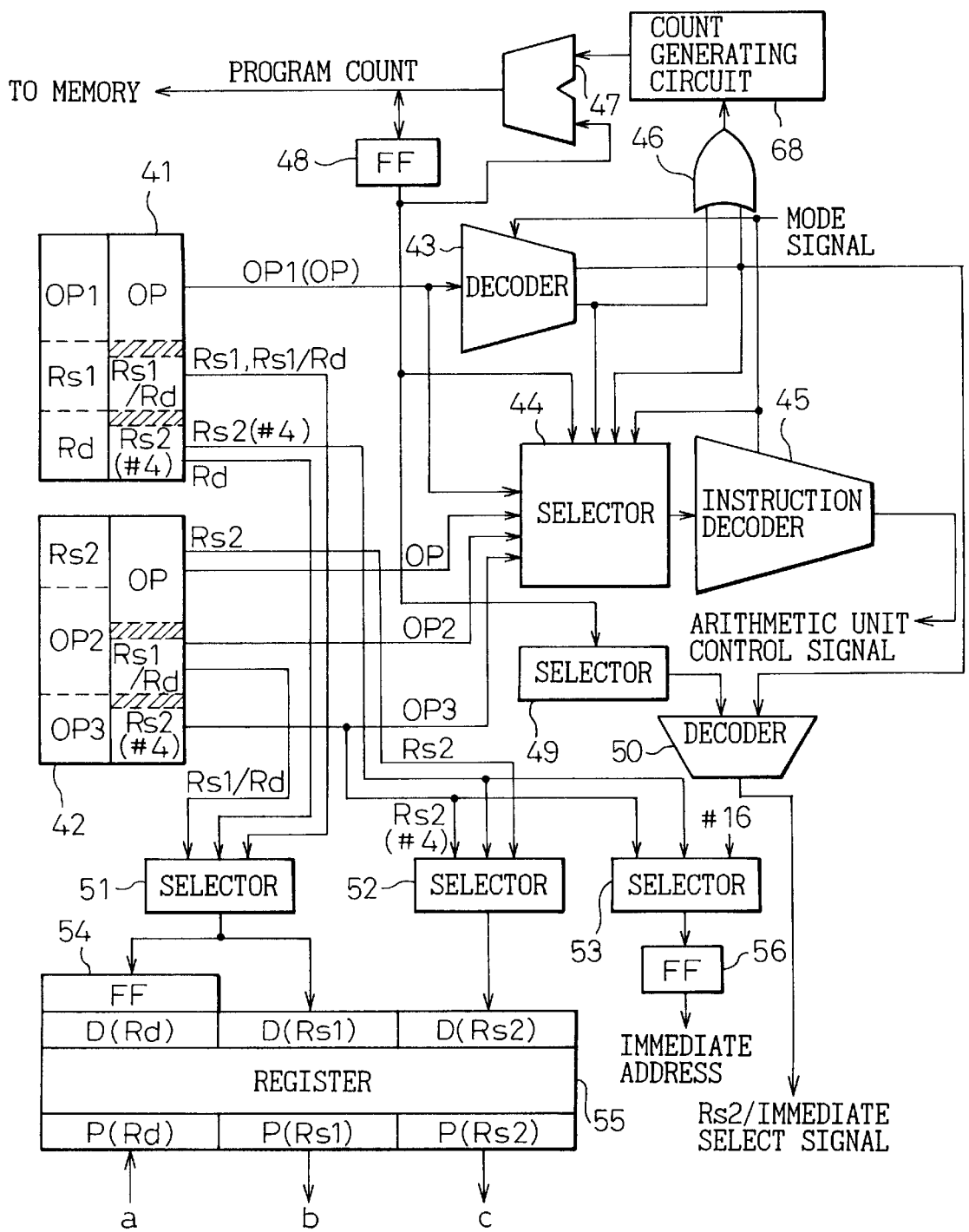
FIG. 10 is a diagram showing a part of the configuration of an instruction control mechanism according to an embodiment.
Figure 11:
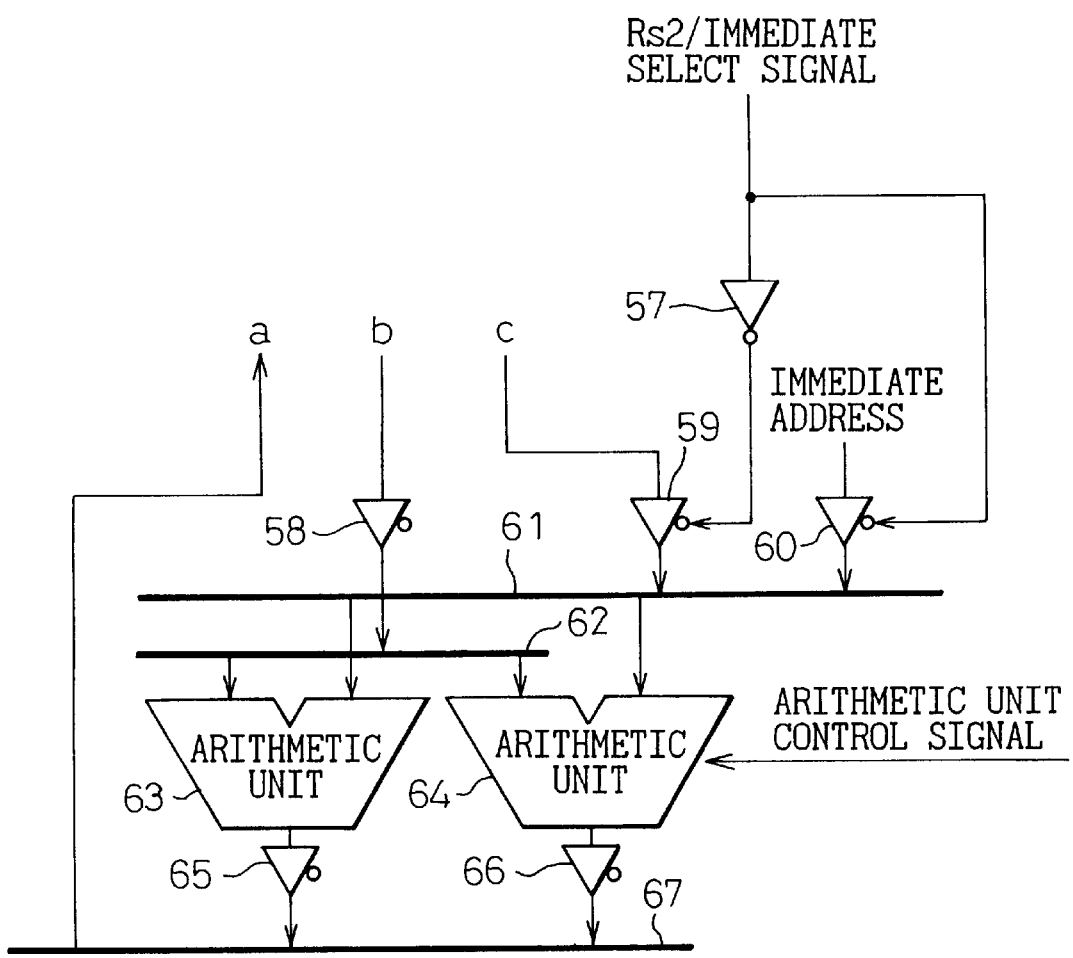
FIG. 11 is a diagram showing the remaining part of the configuration of an instruction control mechanism according to the same embodiment.

FIGS. 10 and 11 are diagrams showing a configuration of an instruction control mechanism of a processor according to an embodiment of the present invention. The basic-length instruction execution mode or the abbreviated instruction execution mode is determined by setting a predetermined value in a mode register in response to an instruction in the program. In either mode, an instruction code of 32 bits is read out of a memory and temporarily held in instruction-holding flip-flops (FF) 41, 42. The instruction-holding flip-flop FF 41 holds the most-significant 16 bits and the flip-flop FF 42 holds the least-significant 16 bits. In the case of the basic-length instruction, the FF 41 holds the first instruction field OP1, the first register Rs1 for arithmetic operation and the storage register Rd, while the FF 42 holds the second register Rs2 for arithmetic operation, the second instruction field OP2 and the third instruction field OP3 or the immediate address #16. In the case of the abbreviated instruction, on the other hand, the FF 41 holds one of the instruction fields OP, Rs/Rd and Rs2 (or the immediate address #4), while the FF 42 holds the other instruction field OP, the first register Rs/Rd and the second register Rs2 (or the immediate address #4).

First, an explanation will be given of the operation in basic-length instruction execution mode. The instruction field OP1 is applied to a decoder 43 for judging whether the particular value is 000100 or 000000. If the OP1 is 000100 or 000000, it is a register addressing instruction, while if the value is other than 000100 and 000000, it indicates an immediate addressing instruction. The decoder 43 outputs an instruction mode signal, in accordance with this judgement, and a mode signal. A selector 44 is supplied with OP1 (the same as OP of FF 41), OP2 and OP of FF 42. The selector 44 selects OP2 out of the signals input thereto if a register addressing instruction is involved, and selects OP1 and outputs it to an instruction decoder 45 if an immediate addressing instruction is involved, in accordance with an instruction mode signal. As described above, the register addressing instruction OP2 and the immediate addressing instruction OP1 assume the same value for a similar processing. Therefore, it is enough for the instruction decoder 45 to identify a maximum of 62 instructions. The instruction decoder 45 decodes the OP1 or OP2 input thereto and outputs an arithmetic unit control signal.

A selector 51 is supplied with Rs1, Rd and Rs1/Rd of FF 41 and Rs1/Rd of FF 42, a selector 52 is supplied with Rs2 (#4) of FF 41 and Rs2 and Rs2 (#4) of FF 42, and a selector 53 is supplied with the immediate address #16 (Rs2, OP2, OP3) of FF 42. The selector 51 applies Rs1 and Rd to address decoders D (Rs1) and D (Rd), respectively, of a register 55 in accordance with an instruction mode signal. A flip-flop 54 passes the signal in basic-length instruction execution mode. In similar fashion, the selector 52 applies Rs2 to the address decoder D (Rs2) of the register 55. Further, the selector 53 selects the immediate address #16 of FF 42 and outputs it to FF 56 in accordance with the instruction mode signal. In these diagrams, the wiring for leading the instruction mode signal to the selectors 51, 52 and 53 is not shown.

In the case where the instruction mode signal indicates a basic-length instruction, a count generating circuit 68 generates 4 and applies it to a program counter 47. The program counter 47 adds this value of 4 to the immediately preceding program count held in FF 48 and thus increments the value on the program counter. The selector 49, on the other hand, is associated with the abbreviated instruction alone but not with the basic-length instruction. A decoder 50 is supplied with part of the instruction mode signal and the output of the selector 49. In the case of the basic-length instruction, the decoder 50 selects part of the instruction mode signal and outputs it as a Rs2/immediate select signal.

As shown in FIG. 11, the value output from the read/write port P (Rs1) of the register 55 is output to an internal bus 62. In accordance with the Rs2/immediate select signal, one of the outputs of the FF 56 and the read/write port P (Rs2) of the register 55 is output to another internal bus 61. Arithmetic units 63, 64 process the values on the internal buses 61, 62 as specified by the arithmetic operation control signal output from the instruction decoder 45, and output the result to still another internal bus 67 through output ports 65, 66. The values output to the internal bus 67 are written in the read/write port P (Rd) of the register 55 at an appropriate timing.

As described above, in the case of a register addressing instruction, the values on the register specified by Rs1 and Rs2 are processed, and the result thereof is stored in the register specified by Rd. In the case of an immediate addressing instruction, on the other hand, the value on the register specified by Rs1 and the immediate address #16 are processed, with the result thereof being stored in the register specified by Rd.

Now, an explanation will be given about the operation in abbreviated instruction execution mode. The OP held in the FF 41 for the abbreviated instruction is the same bit as OP1, which is applied to the decoder 43 for judging whether the value thereof is 000100 or 000000. In the case where OP is 000100 or 000000, it is judged that a basic-length register addressing instruction is involved and the above-mentioned processing for the basic-length instruction is performed even in abbreviated instruction execution mode. In the case where an abbreviated instruction coexists with a basic-length instruction, however, it is assumed that the basic-length instruction is limited in such a manner as to be held in a 4-byte boundary, i.e., the OP (OP1) of FF 41. Unless OP is 000100 or 000000, it indicates an abbreviated instruction, so that the count generating circuit 49 generates 2 and increments the program counter 47 by 2.

The decoder 43 outputs an instruction mode signal in accordance with the judgement and the mode signal. In the case of the abbreviated instruction, the selector 44 judges the least-significant bit of the output of the FF 48 that has latched the output of the program counter 47 and outputs the judgement as to whether the OP of the FF 41 or FF 42 is to be selected. Specifically, when the least-significant bit of the output of FF 48 is "0", the OP of the FF 41 is selected, and when it is "1", the OP of the FF 42 is selected. In the case where it is judged that a basic-length register addressing instruction is involved as described above, the OP of FF 41, i.e., the OP1 is selected and output. The instruction decoder 45 generates an arithmetic operation control signal by decoding the output of the selector 45. In this way, the OP of the abbreviated instruction and the OP2 of the register addressing instruction assume the same value for a similar processing, and therefore the instruction decoder 45 can perform the same decoding operation as for the basic-length instruction. In the case where the abbreviated instruction is involved, the selector 51 applies Rs1/Rd of FF 41 to D (Rs1) of the register 55 when the least-significant bit of the output of FF 48 is "0", and applies Rs1/Rd of FF 42 to D (Rs1) of the register 55 when the least-significant bit of the output of FF 48 is "1". At the same time, the output of the selector 51 is temporarily held in FF 54, and then applied to D (Rd) of the register 55. This is in order to write the result of processing in the arithmetic units 65, 66 into the read/write port P (Rd) specified by Rs1/Rd after the particular processing. In the case of the basic-length instruction, the selector 51 outputs Rs1 and Rd of FF 41 to D (Rs1) and D (Rd), respectively, of the register 55.

In similar fashion, the least-significant bit of the output of FF 48 for the abbreviated instruction is "0", the selector 52 outputs Rs2 (#4) of FF 41 to D (Rs2) of the register 55, and outputs Rs2 (#4) of FF 42 to D (Rs2) of the register 55. In the case of the basic-length instruction, on the other hand, the selector 52 outputs Rs2 of FF 42 to D (Rs2) of the register 55.

Also, in the case where the abbreviated instruction is involved, the selector 53 outputs Rs2 (#4) of FF 41 to D (Rs2) of the register 55 when the least-significant bit of the output of FF 48 is "0", and outputs Rs2 (#4) of FF 42 to D (Rs2) of the register 55 when the least-significant bit of the output of FF 48 is "1". As described above, in the case of the basic-length instruction, the selector 53 outputs #16 of FF 42. In view of the fact that the abbreviated instruction cannot coexist with the basic-length immediate addressing instruction, however, it is impossible for the selector 53 to output #16 in abbreviated instruction execution mode. FF 42 holds and outputs #16, and therefore, in the case of the abbreviated instruction, adds 12 Os as the most-significant bits of Rs2 (#4).

As shown in FIG. 9, the abbreviated instruction having both the 9th and 5th bits (25th and 20th bits) at zero is an immediate addressing instruction. The selector 49 is supplied with the values of the 25th, 20th, 9th and 5th bits, i.e., the bits in the hatched portions of FF 41 and FF 42 in FIG. 10, and produces a Rs2/immediate select signal for selecting the 25th bit with the 20th bit or the 9th bit with the 5th bit in accordance with the value on the program counter, so that in the case where the two selected values are both "0", the immediate address output from FF 56 is selected, while when the two selected values are both "1", the value of the register specified by Rs2 output from the read/write port P (Rs2) of the register 55 is output.

The subsequent processing is identical to that for the basic-length instruction.

All the basic-length instructions cannot be defined as abbreviated instructions. Even when using the abbreviated instructions for reducing the program size, therefore, the use of an instruction not defined as an abbreviated instruction requires the use of a basic-length instruction. Also, the abbreviated instruction has a smaller number of bits of the operands Rs1, Rs2 and Rd for specifying a register, and therefore all the registers used for the basic-length instructions cannot be used for the abbreviated instructions. For a register that cannot be used for the basic-length instruction, therefore, the basic-length instruction is required. According to this embodiment, as described above, even in abbreviated instruction execution mode, it is automatically judged that the basic-length instruction is involved and the corresponding processing is performed in the case where the first instruction field OP1 (OP held in FF 41) is 000100 or 000000. Consequently, even if the basic-length instruction (not other than the register addressing instruction, however) is executed during the execution of the abbreviated instruction, the mode need not be switched and thereby the program can be simplified.

As will be understood from the foregoing description, according to the present invention, the abbreviated instructions can coexist with the basic-length instructions without any waste of the instruction code, and therefore the program size can be efficiently compressed.

Also, in view of the fact that the basic length instructions and the abbreviated instructions can be rendered to coexist in the same instruction in abbreviated instruction execution mode, all the registers can be effectively used.

Further, according to the invention, the instruction decoder can be shared for the processing, and therefore, the configuration thereof can be simplified. Thus, the number of stages of pipelines need not be increased, and even when the number of instructions is increased, the hardware size of the decoder is minimized.

What is claimed is:

1. An instruction control mechanism, for processors, for decoding and executing an instruction set including an instruction code having an instruction field, a first field containing the description of the name of a register to be processed and a second field containing the description of selected one of another register to be processed and an immediate address, comprising:

an instruction decoder for decoding the value of said instruction field;

a plurality of registers specified by the name of said register to be processed and the name of said another register to be processed;

a memory unit for storing said immediate value; and an arithmetic operation circuit for processing selected one of the values of said registers and the values stored in said registers and said memory unit in accordance with the result of decoding by said decoder;

wherein said register instruction code containing the description of said another register to be processed in said second field sets a specified value in said instruction field and contains the description of a second instruction field in the portion of said second field other than the portion thereof containing the description of said another register to be processed;

the immediate instruction code containing the description of said immediate address in said second field contains the description of a value other than said specified value in said instruction field; and the same value is assigned to said first instruction field and said second instruction field of at least a part of said immediate instruction code and at least a part of an immediate-like register instruction code for processing the same operation except that said immediate address is used in place of the value of said another register to be processed;

said instruction control mechanism comprising:

a register instruction detection circuit for judging whether said first instruction field is said specific value; and a select circuit for switching the operation in such a manner that said second instruction field is applied to said instruction decoder in the case where said first instruction field is said specified value and said first instruction field is applied to said instruction decoder in the case where said first instruction field is not said specified value, in accordance with the judgement of said register instruction detection circuit.

2. An instruction control mechanism, for processors, according to claim 1;

wherein at least part of the second register instruction code not using said immediate value and the value of said another register to be processed has said first instruction field assigned with a second specific value other than said first specific value and said second instruction field assigned with the same value as the value of said second instruction field of said immediate-like register instruction code for performing a process similar to said immediate instruction code and said immediate-like instruction code, and said register instruction detection circuit judges whether said instruction field is said second specific value or not.

3. An instruction control mechanism, for processors, according to claim 1;

wherein said instruction set includes an abbreviated instruction code corresponding to at least part of said immediate instruction code and said immediate-like register instruction code and shorter than the basic-length immediate instruction code and the basic-length immediate-like instruction code; and the instruction field of said abbreviated instruction code is located at the same position as the instruction field of said basic-length instruction code and has the same value as said second instruction field of said immediate-like register having similar contents to be processed;

said instruction control mechanism further comprising a mode switching circuit for switching between the basic-length mode for processing said basic-length instruction code and the abbreviation mode for processing said abbreviated instruction code, said instruction decoder changes the decoding process in accordance with the prevailing mode.

4. An instruction control mechanism, for a processor, according to claim 2;

wherein said instruction set includes an abbreviated instruction code corresponding to at least part of said immediate instruction code and said immediate-like instruction code and shorter than said basic-length immediate instruction code and said basic-length immediate-like register instruction code; and said instruction field of said abbreviated instruction code is located at the instruction field of said basic-length instruction code and has the same value as said second instruction field of said immediate-like register having similar contents to be processed;

said instruction control mechanism further comprising a mode switching circuit for switching between the basic-length mode for processing said basic-length instruction code and the abbreviation mode for processing said abbreviated instruction code;

said instruction decoder changes the decoding process in accordance with the prevailing mode.

5. An instruction control mechanism, for processors, according to claim 3;

wherein in the case where said register instruction detection circuit detects that said instruction field is said specific value in said abbreviation mode, said instruction decoder processes said instruction code as said basic-length instruction code.

6. An instruction control mechanism, for processors, according to claim 4;

wherein in the case where said register instruction detection circuit detects that said instruction field is a selected one of said specific value or said second specific value in said abbreviation mode, said instruction decoder processes said instruction code as said basic-length instruction code.

7. An instruction control mechanism, for processors, according to claim 5;

wherein an inter-register transfer instruction is assigned to said second register instruction code.

8. An instruction control mechanism, for processors, according to claim 6;

wherein an inter-register transfer instruction is assigned to said second register instruction code.

* * * * *

UNITED STATES PATENT AND TRADEMARK OFFICE
CERTIFICATE OF CORRECTION

PATENT NO.:    5,938,759
DATED     :    August 17, 1999
INVENTOR(S):   Shunsuke KAMIJO It is certified that error appears in the above-identified patent and that said Letters Patent is hereby corrected as shown below:

Please delete col. 11, line 38 through col. 14, line 17, in its entirety, and substitute therefor the following:

1. An instruction control mechanism for processors, for decoding and executing an instruction set including an instruction code having an instruction field, a first field containing the description of the name of a register to be processed and a second field containing the description of selected one of another register to be processed and an immediate address, said instruction control mechanism comprising:

an instruction decoder decoding the value of said instruction field;

a plurality of registers individually specified in accordance with a name of a register to be processed and a name of another register to be processed;

a memory unit storing said immediate address;

an arithmetic operation circuit processing selected ones of the values of said registers and the values stored in said registers and said memory unit in accordance with the result of decoding by said decoder wherein:

UNITED STATES PATENT AND TRADEMARK OFFICE
CERTIFICATE OF CORRECTION

PATENT NO.:    5,938,759
DATED     :    August 17, 1999
INVENTOR(S):   Shunsuke KAMIJO It is certified that error appears in the above-identified patent and that said Letters Patent is hereby corrected as shown below:

>said register instruction code, containing the description of said another register to be processed in said second field, sets a specified value in said instruction field and contains the description of a second instruction field in a portion of said second field other than the portion thereof containing the description of said another register to be processed,
>
>the immediate instruction code containing the description of said immediate address in said second field contains the description of a value other than said specified value in said instruction field, and
>
>the same value is assigned to said first instruction field and said second instruction field of at least a part of said immediate instruction code and at least a part of an immediate-like register instruction code for processing the same operation except that said immediate address is used in place of the value of said another register to be processed;
>
>a register instruction detection circuit judging whether said first instruction field is said specified value; and
>
>a select circuit switching the operation in such a manner that said second instruction field is applied to said instruction decoder, in the case where said first instruction field is said specified value, and said first instruction field is applied to said instruction decoder, in the case where said first instruction field is not said specified value, in accordance with the judgement of said register instruction detection circuit.

UNITED STATES PATENT AND TRADEMARK OFFICE
CERTIFICATE OF CORRECTION

PATENT NO.: 5,938,759
DATED : August 17, 1999
INVENTOR(S): Shunsuke KAMIJO

It is certified that error appears in the above-identified patent and that said Letters Patent is hereby corrected as shown below:

2. An instruction control mechanism, for processors according to claim 1, wherein:
at least part of the second register instruction code, not using said immediate value and the value of said another register to be processed, has said first instruction field assigned with a second specific value other than said first specific value and said second instruction field assigned with the same value as the value of said second instruction field of said immediate-like register instruction code for performing a process similar to said immediate instruction code and said immediate-like instruction code; and
said register instruction detection circuit judges whether said instruction field is said second specified value or not.

3. An instruction control mechanism for processors, according to claim 1 wherein:
said instruction set includes an abbreviated instruction code corresponding to at least part of said immediate instruction code and said immediate-like register instruction code and shorter than the basic-length immediate instruction code and the basic-length immediate-like instruction code, and
the instruction field of said abbreviated instruction code is located at the same position as the instruction field of said basic-length instruction code and has the same value as said second instruction field of said immediate-like register having similar contents to be processed; and
said instruction control mechanism further comprises:
a mode switching circuit switching between the basic-length mode for processing said basic-length instruction code and the abbreviation mode for processing said abbreviated instruction code; and
said instruction decoder changes a decoding process thereof in accordance with the mode to which the mode switching circuit is switched.

UNITED STATES PATENT AND TRADEMARK OFFICE
CERTIFICATE OF CORRECTION

PATENT NO.: 5,938,759
DATED : August 17, 1999
INVENTOR(S): Shunsuke KAMIJO

It is certified that error appears in the above-identified patent and that said Letters Patent is hereby corrected as shown below:

4. An instruction control mechanism for a processor according to claim 2, wherein:
said instruction set includes an abbreviated instruction code corresponding to at least part of said immediate instruction code and said immediate-like instruction code and shorter than said basic-length immediate instruction code and said basic-length immediate-like register instruction code and
said instruction field of said abbreviated instruction code is located at the instruction field of said basic-length instruction code and has the same value as said second instruction field of said immediate-like register having similar contents to be processed; and
said instruction control mechanism further comprises:
a mode switching circuit switching between the basic-length mode for processing said basic-length instruction code and the abbreviation mode for processing said abbreviated instruction code, and
said instruction decoder changes the decoding process in accordance with the mode to which the mode switching circuit is switched.

5. An instruction control mechanism, for processors according to claim 3, wherein:
in a case in which said register instruction detection circuit detects that said instruction field is said specific value in said abbreviation mode, said instruction decoder processes said instruction code as said basic-length instruction code.

UNITED STATES PATENT AND TRADEMARK OFFICE
CERTIFICATE OF CORRECTION

PATENT NO.: 5,938,759
DATED : August 17, 1999
INVENTOR(S): Shunsuke KAMIJO

It is certified that error appears in the above-identified patent and that said Letters Patent is hereby corrected as shown below:

6. An instruction control mechanism for processors according to claim 4, wherein:
in a case in which said register instruction detection circuit detects that said instruction field is a selected one of said specific value or said second specific value in said abbreviation mode, said instruction decoder processes said instruction code as said basic-length instruction code.

7. An instruction control mechanism, for processors according to claim 5, wherein:
an inter-register transfer instruction is assigned to said second register instruction code.

8. An instruction control mechanism, for processors according to claim 6, wherein:
an inter-register transfer instruction is assigned to said second register instruction code.

Signed and Sealed this

Twenty-second Day of February, 2000

*Attest:*

Q. TODD DICKINSON

*Attesting Officer*   *Commissioner of Patents and Trademarks*